United States Patent [19]

Schonlau et al.

[11] Patent Number: 4,779,933

[45] Date of Patent: Oct. 25, 1988

[54] PRESSURE REGULATING DEVICE, IN PARTICULAR, FOR PRESSURE FLUID-OPERABLE BRAKE SYSTEMS OF AUTOMOTIVE VEHICLES

[75] Inventors: Juergen Schonlau, Walluf; Alfred Birkenbach, Hattersheim, both of Fed. Rep. of Germany

[73] Assignee: Alfred Teves GmbH, Frankfurt am Main, Fed. Rep. of Germany

[21] Appl. No.: 121,551

[22] Filed: Nov. 17, 1987

[30] Foreign Application Priority Data

Nov. 18, 1986 [DE] Fed. Rep. of Germany ....... 3639393

[51] Int. Cl.[4] ............................................. B60T 8/28
[52] U.S. Cl. .................................. 303/9.73; 303/9.67; 303/9.75
[58] Field of Search ................... 303/6 C, 6 R, 22 R, 303/24 R, 24 A, 24 C, 24 F

[56] References Cited

U.S. PATENT DOCUMENTS

| 4,261,623 | 4/1981 | Mizusawa | 303/6 C |
| 4,351,570 | 9/1982 | Young | 303/24 F |

Primary Examiner—Duane A. Reger
Attorney, Agent, or Firm—James B. Raden

[57] ABSTRACT

The present invention discloses a pressure regulator including a regulating valve disposed in a housing between an inlet and an outlet, with the regulating valve being provided in a regulating piston. The regulating piston is displaceable, in pressure-sensitive manner, against a control force. The valve also includes an inertia element movable in a manner sensitive to acceleration and driving a control piston. To provide a pressure regulator that is inexpensive to manufacture and easy to assemble and having a dynamic pressure characteristic, there is provided a pressure chamber between the control piston and the valve seat of the inertia element which is connected to the main bore, with the volume of the pressure chamber being variable against the force of a resilient element.

9 Claims, 2 Drawing Sheets

PRESSURE REGULATING DEVICE, IN PARTICULAR, FOR PRESSURE FLUID-OPERABLE BRAKE SYSTEMS OF AUTOMOTIVE VEHICLES

BACKGROUND OF THE INVENTION

The present invention relates to a pressure regulating device and in particular to a pressure regulating device for pressure fluid-operable brake systems used in automotive vehicles.

Pressure regulating devices of this type are primarily provided for the regulation of brake pressure to the rear wheels and are arranged between the master cylinder and rear wheel brake of the vehicle to bring the distribution of the brake forces on the front and rear axles during deceleration closer to an ideal distribution characteristic.

A pressure regulating device of this type is disclosed in the German publication DE-OS No. 31 00 916 A1. In the pressure regulator disclosed therein, the input pressure is applied to the regulating piston through a spring and an intermediate piston. The connection between the pressure fluid inlet and the intermediate piston, is interrupted by an inertia element during a predetermined deceleration condition. Upon interruption of the connection, the regulating piston is displaced against the force of the afore-mentioned spring, whereas the intermediate piston, the cross-sectional surface area of which exceeds that of the regulating piston, maintains its position.

This prior art pressure regulator has the disadvantage that the characteristic of the pressure pattern is static after the connection between the pressure fluid inlet and the intermediate piston has been closed by the inertia element.

SUMMARY OF THE INVENTION

It is, therefore, among the objects of the present invention to provide a pressure regulating device of the afore-described type which has low manufacture and assembly costs and, at the same time, avoids the above-stated disadvantages.

The object is achieved according to the invention, in that, between the control piston and the valve seat of the inertia element, a pressure chamber is connected to the main bore the volume of which is variable against the force of flexible means.

This structure enables the control piston to perform, in pressure-sensitive manner, a movement after the inertia element has closed the connection between the valve chamber and the control piston.

According to an important aspect of the invention a particularly low-cost and easy-to-mount design is provided for in that the flexible means is either a preloaded piston or a preloaded diaphragm guided in sealed and displaceable manner in the pressure chamber.

According to another feature, preload of the piston is achieved by way of a spring or gas bubble.

According to a still further important feature of the invention, the dynamic characteristics of the pressure regulator make it particularly suitable for brake systems of automotive vehicles, in that, the regulator is made sensitive to the desired switch-over pressure by providing for an increasing spring rate with an increase in spring deflection.

Due to a dynamic, non-linear pressure characteristic, the pressure distribution of the pressure regulator is adapted to coincide to a substantially higher degree of the ideal brake pressure distribution curve than is possible with the linear pressure characteristics of conventional regulators.

BRIEF DESCRIPTION OF THE DRAWING

The invention will be better understood after reading the following detailed description of the preferred embodiment in conjunction with the drawing in which.

DETAILED DESCRIPTION OF A PREFERRED EMBODIMENT

Figure 1:
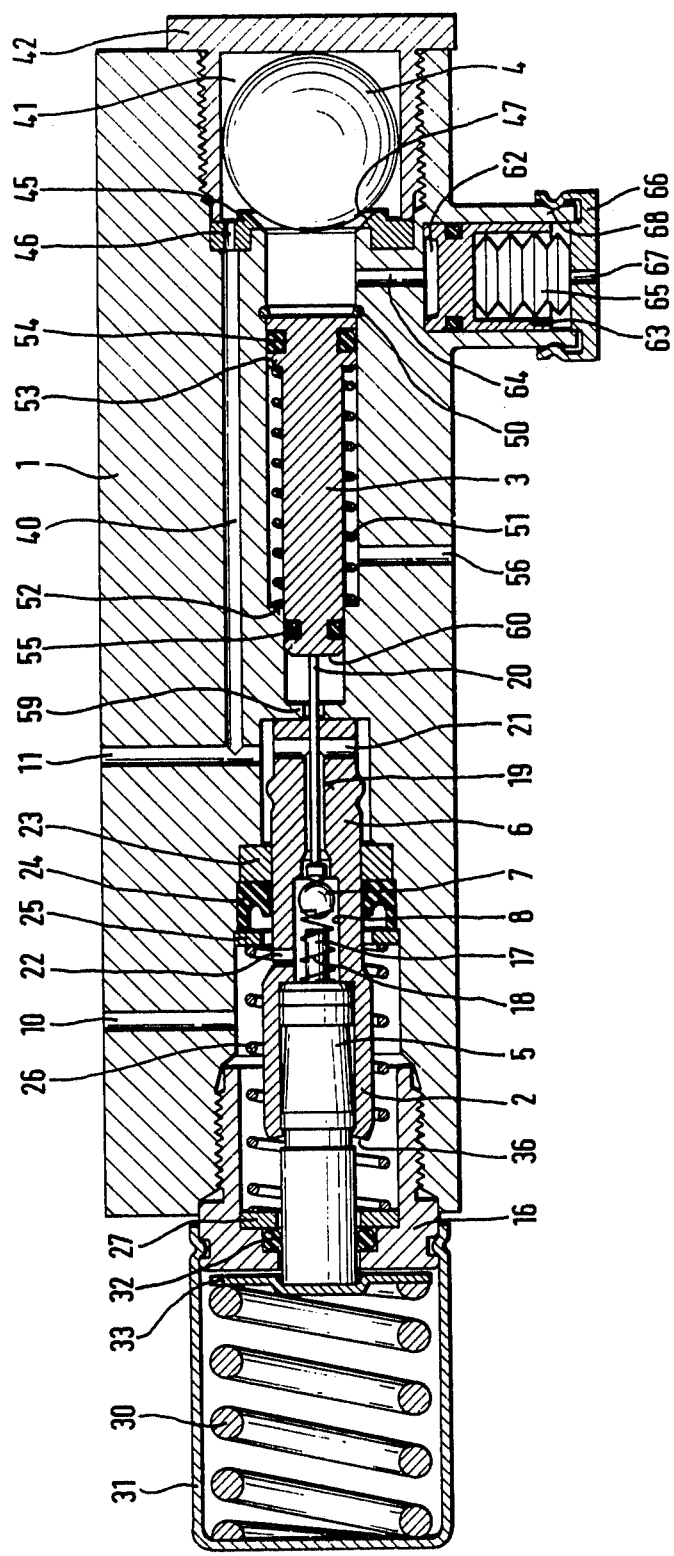
FIG. 1 is a partial cross sectional view of a pressure regulator according to the invention showing details of construction.

The pressure regulator as shown in FIG. 1 includes a housing 1 including a multiple stepped axially extending main bore within which is a two-piece design regulating piston 2, a control piston 3 and an inertia element 4 as well as the connecting bores for the pressure fluid inlet 10 and the pressure fluid outlet 11. The regulating piston 2 includes a valve carrier member 6 and a transmission piston 5 for transferring the control force. The substantially cylindrically shaped transmission piston 5 sealingly protrudes into the stepped, sleeve-type valve-carrying member 6 from the larger outside diameter portion thereof, and is also sealingly disposed in a closure member 16 which is threaded in pressure-tight manner, into the housing. Provided in a recess 8 in the valve carrying member 6 is a valve closure member 7 of spherical configuration which, by way of a valve spring 18 provided on a valve seat mounted on the same ball, is biased into abutment with the inner end of an axial bore 19 in the valve-carrying member 6.

A valve actuating pin 20 is provided with clearance in the bore 19. A transverse bore 21 is in communication with the bore 19. The other end of the valve spring 18 is supported on the transmission piston 5 and is guided by a step 17 provided on the transmission piston 5.

Recess 8, through another transverse bore 22 and the main bore, is in communication with a connecting bore 10 for the pressure fluid inlet. The valve-carrying member 6 is displaceably positioned in a ring 23 and, through a ring seal 24, is sealed against the housing 1.

The ring seal 24 is locked by an annular disc 25 to which force is applied by a spring 26. The other end of the spring 26 is supported on a ring 27 which, in turn, is in abutment with the closure member 16.

Ring 27 is of a smaller inside diameter than the outside diameter of the valve-carrying member 6 and serves as a return-stroke limitation for the regulating piston 2 in that it acts as a stop for the front face 36 of the valve-carrying member 6. A seal 32 is positioned between the transmission piston 5 and the closure member 16 and is locked in place by ring 27.

The control force for the regulating piston 2 is generated by a compression spring 30 which is supported on one end on the bottom interior of a spring cup 31 and which is sealed in an annular groove in the closure member 16. The other end of the spring 30 applies force to a spring retainer 33 partly surrounding the end of the transmission piston 5 protruding from the closure member 16.

Connected to the outlet bore 11, which extends in a direction transverse to the main bore, is a connecting port 40 which extends in an axial direction, that is, in parallel to the main bore. The connecting port 40 terminates in the valve chamber 41 in which is located the inertia member 4. The valve chamber 41 is located in the end of the main bore opposite the regulating piston 2 and is confined by a screw plug 42 of cup-shaped configuration which is screwed, in pressure-tight manner, into the housing 1.

The screw plug 42 comprises a head and a threaded portion which is formed as a hollow cylinder provided with an external thread. The front side of the hollow cylinder fixes a valve seat ring 45 to housing 1 and this ring is provided with a passage bore 46 for communicating between valve chamber 41 and connecting port 40.

One design provides for an axial groove in the bore and for a projection on the valve seat ring 45 to insure that the passage bore 46 and the connecting bore 40 are disposed in mating relationship to thereby cause the valve chamber 41 to communicate with the pressure fluid outlet bore 11.

The sealing face 47 of the valve seat ring 45 protrudes into the valve chamber 41 to such an extent that it can smoothly cooperate with the ball shaped inertia closing member 4.

In the section of the main bore leading away from the plug 42, which section is slightly smaller in diameter than the inside diameter of the valve seat ring 45, there is provided the stepped differential control piston 3. Provided between the piston 3 and the valve chamber 41 is a snap ring 50 secured in a radial annular groove in the main bore. A force acting toward the snap ring 50 upon the control piston 3 is generated by a control spring 51 supported on one end on the housing step 52 and on the opposite end on a control piston step 53. Seals 54 and 55 are provided at both ends of the control piston 3. The seals are axially secured in radial ring grooves in the control piston 3 and seal the piston to the main bore of the housing 1.

The annular chamber formed by the main bore, a part of the cylindrical surface of the control piston 3, the housing step 52 and the control piston step 53, and within which the control spring 51 is located is in communication with a leakage bore 56 extending transversely to the main bore and leading to the atmosphere. The tightness of the gaskets 54 and 55 can be monitored by the leakage from the bore 56.

The valve actuating pin 20 is surrounded by an adequately large flow cross-section and is guided through a constriction 59 of the main bore and abuts the smaller cross-sectional front face 60 of control piston 3. The constriction 59 is formed by two oppositely disposed radial faces, one side of which serves as a stop for the regulating piston 2 and, the other side of which serves as a stop for the control piston 3.

The valve actuating pin 20, at its end facing the valve closing member 7, includes a head-shaped cross-sectional enlargement which cooperates with a correspondingly shaped recess defining a stop in the valve-carrying member 6 for axially locking the pin 20.

The regulating piston 2, in an unpressurized condition, through the force of the compression spring 30, is forced onto the stop at constriction 59. The regulating valve in the regulating piston 2 is opened through the valve actuating pin 20 forcing the valve closing member 7 against the force of the valve spring 18. The regulator is mounted in the automotive vehicle in an inclined position with the inertia element 4 in abutment with the screw plug 42 to keep the passage through the valve seat ring 45 open. The control piston 3, through the force of the control spring 51, is urged against the snap ring 50.

A connecting port 64 between the snap ring 50 and the valve seat ring 45 radially outwardly branches off from the main bore. The connecting port 64 connects the main bore to a variable volume pressure chamber 62 of cylindrical shape, the longitudinal axis of which is also directed radially outwardly.

Located in the pressure chamber 62 is an axially displaceable prestressed piston 63 which is sealed against the housing 1. The piston 63, on the side thereof opposite the pressure chamber 62, is provided with a recess in which is contained a cup spring package 65. The cup spring package, on the one hand, is supported on the piston 63 and, on the other hand, is supported on a closure cap 66 sealed in a groove 68 provided in the housing 1. The closure cap 66 is provided with a bore 67 through which the chamber accommodating the cup spring package 65 is in communication with the atmospheric pressure.

Numerous resilient and prestressing structures can be provided to vary the volume of the chamber 62 in addition to a cup spring and piston including a spring loaded diaphragm or even a compressible fluid enclosed to form a compressible resilient bubble.

During pressure build-up in the brake system, the input pressure $P_E$ acts upon the regulating piston 2, displacing the same against the force of the compression spring 30. At the same time, the control piston 3, to which pressure is also applied, is displaced on account of the difference between the surface areas of the front face 60 and the opposite end of the control piston against the force of the control spring 51, thereby moving the valve actuating pin 20 toward the regulating piston 2.

Due to the specific spring rates of the compression spring 30 and of the control spring 51, the control piston 3 covers a greater distance per bar pressure increase than does the regulating piston 2.

The effect of the pressure chamber according to the invention on the regulating pattern of the pressure regulator will now be described with reference to FIG. 2 which shows a pressure diagram illustrating the output pressure $P_A$ versus the input pressure $P_E$.

The switch-over pressure $P_U$ of the regulator is reached when the control piston 3, during a pressure build-up in the course of a deceleration has covered a predetermined distance, the inertia element 4 has placed itself onto the valve seat 45 and once the regulating piston 2 has displaced itself against the force of the compression spring 30 to such an extent that the valve closure member 7 has accordingly, initially closed the connection between the pressure fluid inlet 10 and the pressure field outlet 11. In the absence of a pressure chamber 62 and a spring-loaded piston 63 as provided by the invention, the pressure pattern would correspond to the straight line $M_2$.

With the inertia valve 4, 45 closed and the output pressure $P_A$ rising, the control piston 3, in response to the movement of the piston 63, can be displaced toward the initial, at rest position, thereby reducing the gradient of the regulating curve in response to the switch-over pressure. That is, the pressure gradient extends, as shown in FIG. 2, from $P_U$ to $P_X$, with $P_X$ being located on a pressure reducing straight line $M_1$ associated with a switch-over pressure $P_G$ lower than $P_U$. Due to the curvature of the path between $P_U$ and $P_X$, the characteristics of the pressure regulator can be adapted with a high degree of precision to the ideal brake force distribution.

Because the cup spring package action is progressive, the decrease in the pressure gradient with a loaded vehicle is less pronounced than with an unloaded vehicle. This also corresponds closely to the ideal brake pressure distribution curve in respect of the two conditions of load.

Figure 2:
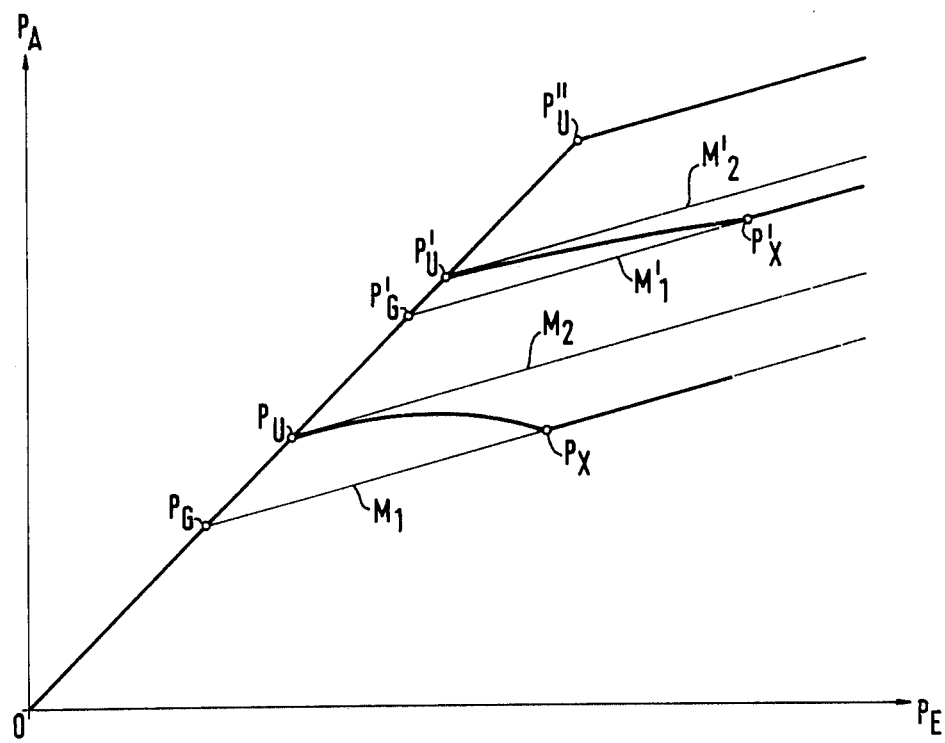
FIG. 2 is a pressure diagram of the pressure regulator according to FIG. 1.

FIG. 2 shows this state of facts in that the pressure difference between $P_U$ and $P_G$ decreases the higher the switch-over point $P_U$ becomes.

It can be see from FIG. 2 that $P'_U - P'_G$ is smaller than $P_U - P_G$, and the corresponding actual pressure curve becomes flatter at a higher switch-over point, that is, $M'_2$ and $M'_1$ are closer to one another than are $M_2$ and $M_1$. $P'_X$ designates the point at which the pressure coincides with the reducing straight line $M'_1$.

$P''_U$ designates a switch-over pressure which is of a magnitude such that the piston 63 is displaced against the force of the cup spring package 65 to a degree such that the cup springs are fully seated. Accordingly, in case of a further rise in the output pressure, the control piston 3 can, therefore, not be pushed back. Such a high switch-over pressure can be attained with a fully loaded automotive vehicle.

What is claimed is:

1. A pressure regulating device for a pressure fluid operable brake system of an automotive vehicle, comprising a housing including a main bore, an inlet and an outlet, a regulating piston disposed in said main bore for displacement in response to an inlet pressure against a control force, a regulating valve provided in said regulating piston, an initial piston in said main bore operatively connected to said regulating valve, an inertia element and a valve seat on said main bore, said inertia element responsive to vehicle acceleration to control pressure to said control piston, a pressure chamber connected to said main bore between said control piston and said valve seat and resilient means for varying the volume of said pressure chamber.

2. The pressure regulating device according to claim 1 wherein the resilient means is a prestressed piston sealed and displaceably guided in the pressure chamber.

3. The pressure regulating device according to claim 1 wherein the resilient means is a prestressed diaphragm.

4. The pressure regulating device according to claim 2 wherein the prestress is attained by a spring.

5. The pressure regulating device according to claim 3 wherein the prestress is attained by a spring.

6. The pressure regulating device according to claim 4 wherein said spring has a progressive spring rate characteristic.

7. The pressure regulating device according to claim 5 wherein said spring has a progressive spring rate characteristic.

8. The pressure regulating device according to claim 2 wherein a cup spring package is provided for prestressing.

9. The pressure regulating device according to claim 1 wherein said resilient means includes an enclosed compressible fluid forming a resiliently compressible bubble in said pressure chamber.

* * * * *